United States Patent [19]

Moufflet et al.

[11] Patent Number: 4,576,571
[45] Date of Patent: Mar. 18, 1986

[54] METHOD OF POLISHING THE SURFACE OF GLASS ARTICLES

[75] Inventors: Luc Moufflet, Vanves; Michel Roux, Marnes La Coquette; Jean Valadier, Viry Chatillon, all of France

[73] Assignee: L'Air Liquide, Societe Anonyme pour l'Etude et l'Exploitation des Procedes Georges Claude, Paris, France

[21] Appl. No.: 648,252

[22] Filed: Sep. 6, 1984

[30] Foreign Application Priority Data

Sep. 6, 1983 [FR] France ................................ 83 14181

[51] Int. Cl.⁴ ........................ F27D 3/00; F27B 14/00; C03B 25/00
[52] U.S. Cl. .......................................... 432/9; 65/120; 432/13
[58] Field of Search ................ 432/9, 13; 65/65, 104, 65/120

[56] References Cited

U.S. PATENT DOCUMENTS

| | | | |
|---|---|---|---|
| 1,626,739 | 5/1927 | Lents et al. | 65/120 |
| 3,188,190 | 6/1965 | Armstrong | 65/104 |
| 3,224,840 | 12/1965 | Lefever | 65/120 |
| 3,811,857 | 5/1974 | Deeg et al. | 65/104 |

FOREIGN PATENT DOCUMENTS

| | | |
|---|---|---|
| 395450 | 10/1920 | Fed. Rep. of Germany . |
| 2037541 | 12/1970 | France . |
| WO82/00635 | 3/1982 | World Intel. Prop. O. . |

*Primary Examiner*—John J. Camby
*Attorney, Agent, or Firm*—Young & Thompson

[57] ABSTRACT

A method of polishing the surface of a glass article consists in exposing the surface of the said article to a flame produced by oxygen and by a fuel. In order to obtain a perfect surface quality, whatever the thickness and configuration of the article processed, while preventing any premature collapse of the article in question, use is made of a flame such that the thermal energy originating from the transfer of heat by convection exceeds the thermal energy originating from the transfer of heat by radiation, and preferably of a flame of the oxygen-hydrogen type.

5 Claims, No Drawings

METHOD OF POLISHING THE SURFACE OF GLASS ARTICLES

BACKGROUND OF THE INVENTION

The present invention relates to a method of polishing the surface of glass articles.

After being manufactured, glass articles display surface defects which are of two kinds:

defects inherent in their manufacture, referred to as defects to a macroscopic scale, such as traces of mould joints, sharp edges which should be smoothed down, accidental markings such as tool impacts, etc.

defects referred to as being of a microscopic scale, such as roughness, minute cracks, etc., which defects impair the appearance of the glass article obtained (brilliancy, transparency, etc.) and its mechanical properties (compressive strength, ... ).

The technique employed in glass manufacture to eliminate these defects is the polishing method which permits improving the surface condition of the article by causing the disappearance of unevennesses and of the other defects.

Amongst the industrial processes for polishing glass articles in use until now, may be mentioned mechanical polishing and chemical polishing. The mechanical polishing operation is performed by means of successive passes of the glass article over ever finer abrasive wheels. This process enables the production of articles of high quality but on the other hand it is very costly. Furthermore, it can only be utilised for articles having a particular geometry, such as bottles produced for high-grade perfumery goods, cut-glass goods, etc. The chemical polishing operation consists in immersing the glass article in an acid bath, most frequently of hydrofluoric acid. This immersion in an acid bath causes the superficial destruction of the siliceous supporting lattice and the elimination of cations, in particular of alkaline cations. This treatment however amounts to no more than a violent cleaning or scouring action and is not applicable to all kinds of glass. Furthermore, it raises many problems in respect of its application and environment, considering the chemical reactants utilised.

Tests were attempted some time ago for polishing glass articles by means of an oxygen-hydrocarbon flame, in particular of oxygen and natural gas, as is disclosed in particular in U.S. Pat. No. 3,188,190. In accordance with these tests, the glass article is caused to pass in front of the oxygen-hydrocarbon flame; this causes a superficial remelting action and the filling of the cracks. In theory, this flame polishing operation should have rendered it possible to obtain a satisfactory surface quality, since all the bonds have time to be normalised at high temperature. Unfortunately, during these tests, a collapse of the article was observed, occurring before an adequate surface quality was obtained, because of excessive in-depth heating. The tests of this nature were actually successful only with glass articles of very great thickness.

SUMMARY OF THE INVENTION

The invention consequently has as its object to provide a method of polishing glass articles by means of a flame which makes it possible to obtain a perfect surface quality whatever be the thickness and outline of the article processed whilst preventing any premature collapse of the article in question.

To this end, this method of polishing the surface of a glass article wherein the surface of the said article is exposed to a flame of oxygen and of the fuel is characterised in that the flame is such that the thermal energy originating from the transfer of heat by convection is greater than the thermal energy originating from the transfer of heat by radiation. In a more specific manner, and in accordance with a preferred feature of the invention, the flame is such that the fraction of the total energy transmitted by radiation is equal to at most 25%, and that the value of $h/Re^{0.5}$ is equal to at least 32 $W/m^2K$, h being the convection exchange coefficient and Re the Reynolds number. In effect, the fraction Ecv of the total energy of a flame which is transmitted by convection is proportional, amongst others, to the factor $h/Re^{0.5}$.

According to another feature of the invention, the flame utilised contains $OH^-$ ions, and preferably, at stoichiometry, the number of $OH^-$ ions per therm of energy supplied exceeds 1.5 mole.

According to another feature of the invention, the flame utilised is an oxidizing flame.

Making allowance for the problem raised, the applicant sought means of ensuring that the temperature $T_1$ obtained at the surface of the article is high whilst keeping the temperature $T_2$ at the interior of the article at a low value, that is to say means for securing a maximum temperature differential $\Delta T$ between $T_2$ and $T_1$. The applicant's investigations enable the following observations to be made: in the case of glass, the transfer of heat by radiation occurs within the thickness of the glass, since this latter is a semi-transparent medium; by contrast thereto, the transfer of heat by convection occurs at the surface only. This is why the applicant developed a flame such that the transfer of heat by convection clearly exceeds the transfer of heat by radiation.

The applicant moreover undertook the investigation of other parameters which intervene in a substantial manner in the polishing method, namely the surface tension and the viscosity of the glass.

Regarding the surface tension, if the surface layer of the glass article is defined as having a surface tension $\sigma_1$ and a temperature $T_1$ and the subjacent inner layer of the said article as having a surface tension $\sigma_2$ and a temperature $T_2$ (which is lower than $T_1$), the requirement for obtaining a satisfactory polishing action is that the surface layer should be spread over the deeper layer, that is to say that it is necessary to increase the surface tension differential $\Delta\sigma$ between the surface layer and the deeper layer. The applicant's investigations have led one to observe that for an increase in $\Delta\sigma$ it is necessary on the one hand to increase the temperature difference between the two layers, meaning to increase $\Delta T$, and on the other hand to reduce $\sigma_1$ (since the value of $\sigma_2$ cannot be affected); and that to reduce the value of $\sigma_1$, it was necessary to raise the temperature $T_1$ of the surface layer, increase the concentration of $OH^-$ ions of the surrounding oxidizing atmosphere, and to have an oxidizing surrounding atmosphere. This is why, taking account of these observations, the applicant developed a flame which as stated in the foregoing promotes the transfer of heat by convection as compared to the transfer of heat by radiation, and which preferably also contains $OH^-$ ions and is oxidizing.

As concerns the viscosity of glass, in order to secure a satisfactory polishing action, it is necessary to decrease the viscosity $\eta_1$ of the surface layer, that is to say to raise the temperature $T_1$ of the said layer. On the other hand, care should be taken to ensure that the internal temperature $T_2$ does not exceed the value at which the viscosity of glass is such as to cause softening of the product. Consequently, and also for this purpose, use should be made of a flame such that the temperature differential $\Delta T$ between the external layer and the internal layer is as great as possible.

DESCRIPTION OF THE PREFERRED EMBODIMENT

According to a preferred embodiment of the invention, the glass article is polished by means of an oxygen-hydrogen flame. In fact, the oxygen-hydrogen flame satisfactorily complies with the required characteristics discovered by the applicant for securing a satisfactory polishing action without collapse of the article processed.

By way of comparative example, let it be stated that:

based on an identical energy provided by the flame, the thermal energy $P_{cv}$ transmitted by convective transfer by means of an oxygen-hydrogen flame, as compared to that of a flame of oxygen and natural gas and as compared to an oxygen-propane flame—is:

$$P_{cv}(H_2) = 1.65 \ P_{cv}(GN) = 2.53 \ P_{cv}(C_3H_8)$$

based on an identical energy provided by the flame, the thermal energy Pr transmitted by transfer by radiation by means of an oxygen-hydrogen flame, as by comparison to a flame of oxygen and natural gas and as compared to an oxygen-propane flame—is:

$$Pr(H_2) = 0.3 \ Pr(GN) = 0.24 \ Pr(C_3H_8).$$

As is apparent, the oxygen-hydrogen flame preferably utilised in accordance with the invention, makes it possible to obtain a ratio between transfer by convection and transfer by radiation which is much greater than with the oxygen-hydrocarbon flames.

On the other hand, and still by way of comparison, the quantity of OH$^-$ ions contained in an oxygen-hydrogen flame is greater by 15 to 25% than that of a flame of oxygen and natural gas and exceeds that of an oxygen-propane flame by 40 to 60%, and this for a surplus of fuel of 5 to 30%. Consequently, it is apparent that the oxygen-hydrogen flame preferably utilised in accordance with the invention causes a greater reduction of the surface tension $\sigma 1$ of the surface layer than the two other oxygen-hydrocarbon flames.

Furthermore, the oxidizing nature of an oxygen-hydrogen flame may be adjusted without difficulties. In fact, since the oxygen and hydrogen are supplied separately to prevent any risk of explosion in case of a flame blow-back, when a surplus of oxygen is added (between 5 and 50% and preferably 20%) and because hydrogen is a gas which mixes very rapidly and has a combustion speed distinctly greater than other fuels such as hydrocarbons, a flame is obtained in which the mixture becomes homogenous very rapidly and the surplus of oxygen remains stable. Now, by way of comparison, this stability could not be obtained with an oxygen-hydrocarbon flame.

It is thus apparent that the utilisation for polishing glass articles of a flame having the characteristics specified in the foregoing and in particular of an oxygen-hydrogen flame makes it possible to resolve a problem regarding which the various tests performed with oxygen-hydrocarbon flames proved to be fruitless.

What is claimed is:

1. A method of polishing the surface of a glass article, comprising exposing said surface to a flame of oxygen and a fuel gas, said flame having a thermal energy originating from the transfer of heat by convection and a thermal energy originating from the transfer of heat by radiation, the fraction of the total energy transmitted by said flame to said surface by radiation being at most equal to 25% and the value of $H/Re^{0.5}$ being at least equal to 32 W/m$^2$K, h being the convection exchange coefficient and Re the Reynolds number, said flame containing OH$^-$ ions and being an oxidizing flame.

2. A method according to claim 1, wherein at stoichiometry the number of OH$^-$ ions per therm of energy supplied exceeds 1.5 mole.

3. A method according to claim 1, wherein the said flame comprises a surplus of oxygen compared to fuel gas comprised between 5% and 50%.

4. A method according to claim 3, wherein the flame comprises oxygen and hydrogen.

5. A method according to claim 4, wherein the oxygen and hydrogen are mixed together substantially only at the exit of the burner.

* * * * *